2,921,041

ANTICORROSIVE SHIPBOTTOM PAINT

William J. Francis, Portsmouth, Va.

No Drawing. Application December 8, 1954
Serial No. 474,045

26 Claims. (Cl. 260—19)

(Granted under Title 35, U.S. Code (1952), sec. 266)

The invention described herein may be manufactured and used by or for the Government of the United States of America for governmental purposes without the payment of any royalties thereon or therefor.

The instant application is a continuation-in-part application of application Serial Number 392,060, filed November 13, 1953, which was permitted to become abandoned in view of and after the filing of the instant application.

The present invention relates to coating materials, and more particularly relates to a corrosion preventive paint suitable for protecting metal surfaces against the detrimental effects of sea water and air, and specifically relates to a substrate anticorrosive paint for ships.

Corrosion preventive paints for direct use on metallic surfaces of ships should adhere to the ships metal for extended periods of time when exposed to sea water, the atmosphere, or both, without undergoing rapid disintegration, cracking, scaling, or peeling. For most effectiveness, the paint film must have a low water absorption and permeability rate and must not be subject to rapid embrittlement and deterioration. A further requirement of the paint film is that it inhibit the galvanic and electrolytic action to which steel or aluminum under water is always subjected. An object of the invention is to provide a paint which supplies, to an improved degree, the foregoing requirements.

It is a further object of the present invention to provide a protective coating for metallic surfaces which dries quickly in from about 1 to about 3 hours, even under adverse conditions.

Another object of the present invention is to provide a corrosion preventive paint which may be applied without priming to metallic surfaces to be exposed underwater, the paint itself functioning both as a primer and as a protective coating.

A further object of the invention is to provide a corrosion preventive paint to which subsequent paint coats adhere satisfactorily.

It is another object of the present invention to provide a corrosion-preventive paint which may be used on a rusted surface and still have excellent durability and adhesion to a degree not found in other anti-corrosive ships' paints. Consequently, preliminary preparation of the surface is minimized.

Still another object of the invention is to provide a paint that has good can stability under long storage, and is non-skinning in the container.

A further object of the invention is to provide a coating of a type described, having the advantages set forth and using a varnish of very short oil length in the order of six gallons of drying oil with 100 pounds of hard varnish resin. Previous attempts to use an anti-corrosive paint comprising a short oil varnish on metals submerged in water have not had satisfactory results because the resulting paint film was hard and brittle, and would blister so that the paint quickly deteriorated.

Another object of the invention is to provide a coating made with a varnish of which the major constituents are reacted together under high temperature heat treatment.

Still another object of the invention is to provide a coating utilizing a combination of a hard (260° to 279° F. melting range) and a soft (melting range 41° to 59° F.) coumarone-indene resin in a cooked oleoresinous varnish.

An object of the invention is to provide a varnish vehicle based on a heat product of a hard resin combination of hard coumarone-indene and paraphenyl phenol resins, the hard coumarone-indene being limited, however, to a maximum of close to 50% by weight of the combination but may be as little as about 10%. The heat product of this combination is important in obtaining highly improved performance characteristics in a marine coating.

Other objects and attendant advantages of the present invention will be made apparent to those skilled in the art by reference to the following detailed description.

In general, a paint comprises a pigment portion combined with a vehicle portion which hardens as the paint dries to bond the pigment portion to the painted surface. The vehicle portion consists of a matrix which forms a binder for the pigment portion, and which is liquified for application by heating or by a solvent. The pigment portion of the paint may include coloring, fillers, toxic agents, passivating agents, etc., depending upon the purpose for which it is intended. An outline of the general ingredients of a paint is set forth in column 3 of Patent No. 2,579,610, dated December 25, 1951. However, the matrix of a substrate paint must adhere to the protected surface and must in turn provide an adequate base for subsequent paint coats. Generally, the matrix of a paint is usually pervious to water to some extent, and it is desirable to provide a pigment portion in the paint which will at least retard detrimental action by such water, preferably by reducing as much as possible the permeability of the final paint film to water. Additionally, with paints used on ferrous metals, the final paint film should inhibit rusting.

In general, a paint embodying the present invention contains nonhardening resins which retard aging and prevent rapid embrittlement of the paint film, thus providing long life and good adhesion to the protected surface. A liquid composition paint embodying the invention has properly proportioned ingredients consisting of a vehicle comprising a short oil length (six gallon) varnish with para-phenyl phenol-formaldehyde resin and a hard para-coumarone-indene resin combined as the hard resin component in a heat blend with tung oil and linseed oil, the combination being plasticized with a viscous plastic type of low-melting range para-coumarone-indene resin and dissolved in a solvent; and of a pigment portion containing an ingredient, such as zinc chromate, which will release soluble chromate ions in the paint matrix, thereby preventing corrosion of the underlying steel in the event that some water penetrates the paint film.

The use of soft para-coumarone-indene resin in the proper proportions as a plasticizer in the novel short oil varnish paint of the invention is important. It has been found to reduce the hardness and brittleness of the resulting paint film; and it has been found to promote adhesion of paint film, thereby eliminating blistering of the paint film on metals submarged in water, particularly sea water, for long periods of time. Of additional importance is the fact that the ingredients of the paint embodying the invention are fully compatible.

A vehicle in accordance with the present invention is compounded from ingredients in the following proportions by weight:

| Ingredient | Vehicle | | Matrix Only | |
|---|---|---|---|---|
| | Range In Percent | Preferred In Percent | Range In Percent | Preferred In Percent |
| Matrix | 59 to 61 | 60 | | 100 |
| Para-phenylphenol-formaldehyde oil-soluble resin (with melting range 185-225° F.) | 15.76 to 31.23 | 16.51 | 26.27 to 52.05 | 27.51 |
| Hard para-coumarone-indene resin (with melting range of 260 to 279° F.) | 3.16 to 17.35 | 16.51 | 5.26 to 28.92 | 27.51 |
| Tung oil | 8.86 to 12.18 | 10.35 | 14.76 to 20.3 | 17.25 |
| Linseed oil | 3.69 to 6.50 | 5.18 | 6.15 to 10.83 | 8.63 |
| Soft para-coumarone-indene resin (with 41 to 59° F. melting range) | 9.06 to 13.72 | 11.45 | 15.10 to 22.86 | 19.10 |
| Solvent | 39 to 41 | 40 | | |
| Xylol | 30 to 40 | 30 | | |
| Turpentine | 0 to 10 | 10 | | |

In making the matrix, the hard para-coumarone-indene resin, the para-phenyl phenol-formaldehyde resin, the linseed oil, and the tung oil are placed in a varnish-cooking kettle, and gradually heated as a batch to a temperature of 460° F. (plus or minus 5° F.) in forty (40) to fifty (50) minutes. The mixture is allowed to cook at 460° F. (plus or minus 2° F.) for a period of twenty (20) to twenty-five (25) minutes after which the heat is removed. The soft para-coumarone-indene resin is then added to the hot varnish melt with stirring and the batch or heat product can be called the varnish matrix.

The cooked varnish matrix or heat product is allowed to cool within 16 to 24 minutes to approximately 275° F., at which point the xylol and turpentine are added, with stirring during the addition, thus producing the complete varnish. The varnish is then allowed to cool to room temperature and stored. The finished varnish should have a viscosity of 0.65 to 0.85 poise at 77° F. and a nonvolatile content of 59 to 61% by weight.

A pigment portion of a paint in accordance with the present invention includes chromate-bearing material which is partly soluble in water to produce ions to inhibit corrosion, and mica which acts as a physical barrier for reducing the permeability of the paint to water. Diatomaceous silica may be added as a filler, and venetian red or iron oxide as a coloring pigment. The pigment portion is compounded in the following proportions by weight:

| Ingredient | Pigment | |
|---|---|---|
| | Range, percent | Preferred, percent |
| Barium chromate, strontium chromate or zinc chromate | 50-75 | 60 |
| Venetian red or iron oxide | 5-15 | 10 |
| Mica (graphitic or wet ground) | 15-30 | 15 |
| Diatomaceous silica | 0-15 | 15 |

A drying agent is added to the vehicle to accelerate the hardening of the drying oils included therein, the drying action varying with the type of drying agent used. In the present invention lead linoleate is used as a drying agent, which causes thorough drying of the paint from the bottom of the paint film. Lead linoleate acts also as a peptizing agent in the paint by promoting better pigment suspension and preventing settling of the pigment to a hard packed layer during storage in the container.

In preparing the paint, the ingredients are compounded in the following proportions by weight:

| Ingredient | Complete paint | |
|---|---|---|
| | Range, percent | Preferred, percent |
| Varnish vehicle | 53.87-56.28 | 55.08 |
| Pigment | 39.62-45.83 | 42.76 |
| Lead linoleate, 26 to 28% lead | 0.3-0.6 | .43 |
| Xylol or solvent naphtha | 0.0-3.5 | 1.73 |

The lead linoleate and a small quantity (about a gallon or two for a 100-gallon batch) of the varnish are mixed to a thin liquid consistency, and the lead linoleate liquid is added to approximately half the varnish vehicle, stirring to obtain a uniform dispersion. The pigment is then added to this linoleate-varnish mixture, and the whole is mechanically agitated to form a pasty mixture of a suitable consistency for grinding in a paint mill.

Grinding the pigment in the lead linoleate-varnish mixture produces a uniform dispersion of the pigment in the vehicle. Any type paint mill may be employed, such as for example a roller or pebble mill; and the grinding is continued until a fineness of 4 (Hegeman gage) is produced. The ground paint base is then thoroughly mixed with the remainder of the varnish vehicle and the solvent, and placed in containers for storage or use.

A paint in accordance with the foregoing has many desirable characteristics, especially as compared to prior paints of the same general class. Among these advantages are:

The prepared paint when sprayed as a single film onto a metal surface to be protected will provide a uniform dry film having a thickness of two or three mils per coat as compared to one-half that thickness obtained with other paints, and a fewer number of coats of the new paint will produce a required thickness of coating. A coat of paint in accordance with the invention sets to touch in 10 to 15 minutes and dries in from 1 to 2 hours in normal atmospheric conditions. Even under such adverse drying conditions as 40° F. and 80% humidity, the paint dries within three hours.

The pigment portion in the paint reduces the permeability of the paint film to water to a small percentage of that of conventional paints. Moreover, the paint film of the new paint on steel has a chemical or passivating action through the release of soluble chromate ions into any water which should penetrate the paint film, and so inhibits corrosion of the metal. Actually the pigment portion of the new paint improves the varnish binder, apparently acts chemically on the painted steel surface, and improves the water-resistance of the paint film.

The new paint has low permeability to seawater under total immersion, thereby eliminating to a large extent the detrimental galvanic and electrolytic corrosive action on metal exposed under water. This property is largely because of the unique composition and processing of the binder portion of the paint, which results in a definitely more water-resistant binder than any heretofore known. In a comparison test between the new paint and the standard anticorrosive paint, Navy Formula 14, in which a single coat of 2.5 mils film thickness was applied to steel panels and then exposed to seawater immersion, the standard paint coat failed and resulted in extensive corrosion of the steel within 50 days, whereas the new paint coating remained intact and continued to prevent corrosion of the coated steel. The rate of water penetration through the film was less than one-third that of a paint film of the same thickness on the same steel but obtained with one of the best paints of the prior art known as Navy Formula 14 Shipbottom Paint. The new paint has low water absorption and permeability properties because of the water-resistance characteristic of the vehicle binder, and these properties are further enhanced by the physical blocking action of the flaky micaceous pigment in the composition and by the particular ratio of the quantity of total pigment to binder used.

The present paint is based on a very short oil varnish and is plasticized with a viscous non-drying neutral resin to promote better adhesion and flexibility and to prevent the excessive embrittlement of the film on ageing that is a common fault of such short oil phenolic resin type varnishes without a special type of plasticizer. Past experience has shown that coating films of short oil phenol-formaldehyde resin varnishes become very hard and brittle after exposure, and become deficient in their adhesion to metal substrates during water immersion. In the case of the subject paint, the deficiencies of the normal short oil phenolic varnish binder have been largely overcome without sacrificing durability and water-resistance properties and at the same time enhancing the adhesion characteristics of binder.

Although the new anticorrosive paint is designed as the anti-corrosive undercoat as the basis for the application of an antifouling paint for the protection of submerged steel surfaces (shipbottoms), it can also be very satisfactorily used by itself or topcoated with conventional outside paint to give long term durability for the protection of metal surfaces exposed to atmospheric conditions.

The present paint provides a satisfactory undercoat paint for metal to be coated with a hot plastic (hot melt) type of antifouling, vinyl antifouling paint or conventional antifouling paint for underwater use.

The present paint can withstand weather exposure, and can be painted over after such exposure. The present paint can be satisfactorily used on parts that operate below water or above water or both; and where it is alternately wetted and dried. Because of the excellent weathering resistance of the new paint it can be used as a topside protective coating for weather surfaces of metal, as well as an anti-corrosive undercoat for underwater protection of ship-bottoms in which the anti-corrosive undercoat serves as an effective basis for applying an antifouling topcoat paint. This anti-corrosive paint is bifunctional and can serve to protect steel or aluminum structures, either submerged or air-exposed.

Specifically the present paint has a binder based on a very short oil para-phenyl-formaldehyde resin and hard para-coumarone-indene resin varnish, plasticized with a soft para-coumarone-indene resin which slows the ageing process and prevents early checking and cracking failures in the paint film and increases the protective value of the paint. The objectionable tendency of most anticorrosive paints of not maintaining satisfactory pigment suspension and developing settling and hard packing of the pigment during storage of the paint is largely eliminated by the inclusion of lead linoleate which appears to have a peptizing action in this paint.

Obviously, many modifications and variations of the present invention are possible in the light of the above teachings. It is therefore to be understood that, within the scope of the appended claims, the invention may be practiced otherwise than as specifically described.

Having thus described the invention, what is claimed is:

1. A vehicle for an anti-corrosion paint for use on metallic surfaces, said vehicle comprising a matrix having a heat reaction product of ingredients comprising 26.27 to 52.05 percent para-phenyl phenol-formaldehyde resin, and 5.26 to 28.92 percent hard para-coumarone-indene resin having a melting range of 260° to 279° F., and a plasticizer of 15.1 to 22.86 percent soft para-coumarone-indene resin having a melting range of 41° to 59° F., all percentages being by weight of matrix, and comprising varnish oil in a quantity to make said vehicle a short oil length varnish vehicle, said varnish oil comprising tung oil as a major part thereof.

2. A vehicle as defined in claim 1 with lead linoleate as a drying and peptizing agent.

3. A vehicle for an anti-corrosive paint for use on metallic surfaces comprising a matrix having a heat reaction product of 26.27 to 52.05 percent para-phenyl phenol-formaldehyde resin, 5.26 to 28.92 percent hard para-coumarone-indene resin having a melting range of 260°–279° F., 14.76 to 20.3 percent tung oil, and 6.15 to 10.83 percent linseed oil, said matrix having a plasticizer of 15.1 to 22.86 percent soft para-coumarone-indene resin having a melting range of 41° to 59° F., all percentages being by weight of matrix.

4. A vehicle as defined in claim 3 with lead linoleate as a drying and peptizing agent.

5. A vehicle as defined in claim 3 wherein said matrix comprises about 60 percent of said vehicle, the remainder being a solvent, a major part of which is xylol.

6. A vehicle as defined in claim 5 wherein said solvent consists of 30 to 40 percent xylol and 0 to 10 percent turpentine by weight of vehicle.

7. An anti-corrosion paint for use on metallic surfaces, comprising a vehicle including para-phenyl phenol-formaldehyde resin, hard para-coumarone-indene resin having a melting range from about 260° F.–279° F., tung oil and linseed oil, the vehicle plasticized with a soft para-coumarone-indene resin having a melting range from about 41° F.–59° F., said vehicle being combined with a pigment containing a partly water-soluble chromate from the group consisting of zinc chromate, barium chromate and strontium chromate, said tung oil and linseed oil being in such quantity as to make said vehicle a short length varnish vehicle.

8. An anti-corrosion paint as defined in claim 7 including lead linoleate as a drying and peptizing agent.

9. An anti-corrosion paint for use on metallic surfaces as defined in claim 7 but further characterized by said pigment containing mica.

10. An anti-corrosion paint as claimed in claim 9 wherein said pigment includes 50 to 75 percent of an ingredient from said group and 15 to 30 percent mica.

11. An anti-corrosion paint for use on metallic surfaces comprising 53.87 to 56.28 percent of a short oil length varnish vehicle by weight of paint; said vehicle including tung oil and including a heat reaction product of 15.76 to 31.23 percent para-phenyl phenol-formaldehyde resin and 3.16 to 17.35 percent hard para-coumarone-indene resin having a melting range of 260° to 279° F., and a plasticizer of 9.06 to 13.72 percent soft para-coumarone-indene resin having a melting range of 41° to 59° F., percentage being by weight of vehicle; said paint comprising 39.62 to 45.83 percent pigment by weight of paint; said pigment including 50 to 75 percent of an ingredient from the group consisting of barium chromate, strontium chromate and zinc chromate, and 15 to 30 percent mica, said percentages being by weight of pigment.

12. A paint as defined in claim 11 including .3 to .6 percent lead linoleate.

13. A paint as claimed in claim 11 wherein said pigment also includes 5 to 15 percent coloring and 0 to 15 percent diatomaceous silica, said percentages being by weight of the total pigment.

14. A paint as claimed in claim 11 wherein said vehicle includes 8.86 to 12.18 percent tung oil, 3.69 to 6.50 percent linseed oil, and substantially 40 percent solvent, said percentages being by weight of vehicle.

15. A method of compounding an anti-corrosive paint vehicle comprising cooking a batch containing by weight of the matrix of the vehicle 26.27 to 27.51 percent para-phenyl phenol-formaldehyde resin, 5.26 to 27.51 percent para-coumarone-indene resin with a melting range of 260–279° F., 14.76 to 17.25 percent tung oil, and 6.15 to 8.63 percent linseed oil at a temperature of about 460° F., for about 20 minutes, and subsequently adding 15.10 to 22.86 percent para-coumarone-indene resin with a 41°–59° melting point.

16. An anti-corrosive paint as claimed in claim 14 but further characterized by said paint including a small quantity of lead linoleate.

17. An anti-corrosive paint for use on metallic surfaces comprising 53.87 to 56.28 percent vehicle by weight of paint; said vehicle including a heat reaction product of 15.76 to 31.23 percent para-phenyl phenol-formaldehyde resin, 3.16 to 17.35 percent hard para-coumarone-indene resin having a melting range in from 260° to 279° F., 8.86 to 12.18 percent tung oil, and 3.69 to 6.50 percent linseed oil, and a plasticizer of 9.06 to 13.72 percent soft para-coumarone-indene resin having a melting point in a range from about 41° to 59° F., and substantially 40 percent solvent, said percentages of vehicle ingredients being by weight of vehicle; said paint comprising 39.62 to 45.83 percent pigment by weight of paint, said pigment comprising an ingredient from the group consisting of barium chromate, strontium chromate and zinc chromate.

18. An anti-corrosive paint as claimed in claim 17 but further characterized by said paint including a small quantity of lead linoleate.

19. A paint comprising a heat reaction product of para-phenyl phenol-formaldehyde having a melting range of about 185° F. to 225° F., hard para-coumarone-indene resin having a melting range of about 260° F. to 279° F., soft para-coumarone-indene resin having a melting range of about 41° F. to 59° F., and a varnish oil comprising tung oil as a major component, said varnish oil being in such quantity as to make said vehicle a short oil length varnish vehicle, said paint comprising a pigment comprising a partly water-soluble chromate from a group consisting of zinc chromate, barium chromate and strontium chromate, said pigment further comprising mica.

20. A matrix for a short oil length varnish vehicle, by weight said matrix comprising from 20.91 to 31.13 percent varnish oil a major part of which is tung oil, the balance of said matrix comprising essentially 26.27 to 52.05 percent para-phenyl phenol-formaldehyde resin having a melting range from about 185° F. to 225° F., 5.26 to 28.92 percent hard para-coumarone-indene resin having a melting range of about 260° F. to 279° F., and 15.10 to 22.86 percent soft para-coumarone-indene resin having a melting range of about 41° F. to 59° F.

21. A matrix as defined in claim 20 with lead linoleate as a drying and peptizing agent.

22. A matrix as defined in claim 20 but further characterized by said tung oil being from about 14.76 to 20.3 percent of said matrix.

23. An anti-corrosive paint comprising a matrix by weight comprising from 20.91 to 31.13 percent varnish oil a major part of which is tung oil, the balance of said matrix comprising essentially 26.27 to 52.05 percent para-phenyl phenol-formaldehyde resin having a melting range from about 185° F. to 225° F., 5.26 to 28.92 percent hard para-coumarone-indene resin having a melting range of about 260° F. to 279° F., and 15.10 to 22.86 percent soft para-coumarone-indene resin having a melting range of about 41° F. to 59° F., a solvent for said matrix and a pigment, the matrix and solvent comprising about 53.87 to 56.28 percent by weight of the paint, the pigment comprising about 39.62 to 45.83 percent by weight of the paint, said pigment comprising mica and an ingredient from the group consisting of barium chromate, strontium chromate, and zinc chromate.

24. A paint as defined in claim 23 including .3 to .6 percent lead linoleate.

25. A method of compounding an anticorrosive short oil length varnish paint having a matrix, comprising gradually heating to about 460° F. in about 40 to 50 minutes as a batch 26.27 to 52.05 percent phenyl phenol-formaldehyde oil-soluble resin, 5.26 to 28.92 percent hard para-coumarone-indene resin having a melting range in from 260° to 279° F., 20.91 to 31.13 percent of a vehicle oil the major part of which is tung oil; cooking the batch at about 460° F. for about 20 to 25 minutes; and then adding 15.10 to 22.86 percent soft para-coumarone-indene resin having a melting range in about 41° to 59° F. to the batch while hot; thereby providing the paint-matrix, said percentages being by weight of matrix.

26. A method as defined in claim 25 but further characterized by cooling said matrix to about 475° F. in about 16 to 24 minutes, and then adding a thinning solvent.

References Cited in the file of this patent
UNITED STATES PATENTS 2,579,610      Pitre _____ Dec. 25, 1951

OTHER REFERENCES

Official Digest, Fed. Paint & Varnish Paint Clubs, November 1944, pages 528–529.

Cumar: Barrett Div. of Allied Chem. & Dye, 1948, pages 9, 10 and 17.

Cumar: Barrett Div. of Allied Chem. & Dye, 1948, pages 36, 48 and 49.

Valk: Official Digest, pages 260–271, May 1949.

Shreve et al.: Oil Soluble Phenolic Resins, pages 134–141, Ind. & Eng. Chem., January 1951.

Gordon et al.: Surface Coatings & Finishes, pages 28, Chem. Pub. Co., 1954.